(12) United States Patent
Shim

(10) Patent No.: US 6,288,502 B1
(45) Date of Patent: Sep. 11, 2001

(54) HORIZONTAL POSITION ADJUSTING CIRCUIT FOR RASTER

(75) Inventor: Jae Gyou Shim, Suwon (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/126,812

(22) Filed: Jul. 31, 1998

(30) Foreign Application Priority Data

Jul. 31, 1997 (KR) .............................................. 97-21232 U

(51) Int. Cl.$^7$ ...................................................... G09G 1/04
(52) U.S. Cl. ............................ 315/369; 315/371; 315/408
(58) Field of Search ................................... 315/369, 371, 315/399, 403, 408; 348/180, 190

(56) References Cited

U.S. PATENT DOCUMENTS

| | | | |
|---|---|---|---|
| 4,642,533 | * 2/1987 | Carpenter | 315/408 |
| 4,686,432 | * 8/1987 | Berland et al. | 315/403 |
| 4,706,115 | * 11/1987 | Colineau et al. | 358/60 |
| 5,287,043 | * 2/1994 | Brag | 315/371 |
| 5,420,484 | * 5/1995 | Morrish | 315/408 |
| 5,504,521 | * 4/1996 | Webb et al. | 348/180 |
| 6,014,168 | * 1/2000 | Webb et al. | 348/190 |

* cited by examiner

Primary Examiner—Seungsook Ham
Assistant Examiner—Shun Lee
(74) Attorney, Agent, or Firm—Robert E. Bushnell, Esq.

(57) ABSTRACT

A horizontal position adjusting circuit for a raster includes a reference voltage outputting unit for outputting a reference voltage to enable a raster to be centered on a fluorescent screen; a reference voltage adjusting unit for varying an output voltage of the reference voltage outputting unit in accordance with an operating mode for displaying an image signal; and a deflection voltage outputting unit for generating a deflection voltage in accordance with the output signal of the reference voltage outputting unit, and for applying it to a horizontal deflection coil. In accordance with the present invention, the position of the raster formed on the fluorescent screen of the cathode-ray tube is automatically adjusted according to the operating mode so that positioning of the image screen on the fluorescent screen is simply adjusted to be at the center of the fluorescent screen, resulting in improved reliability of the display device.

5 Claims, 2 Drawing Sheets

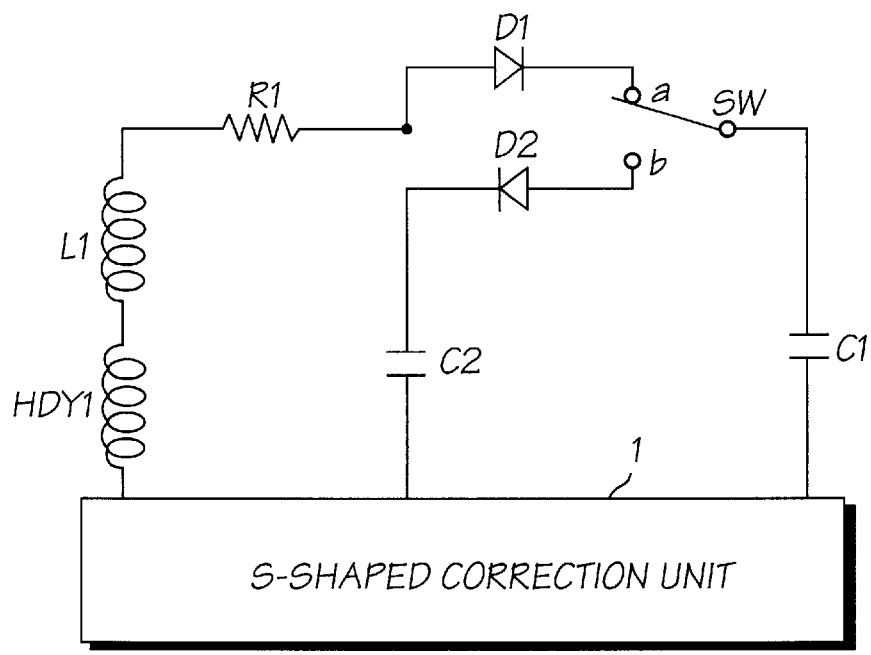
Fig. 1
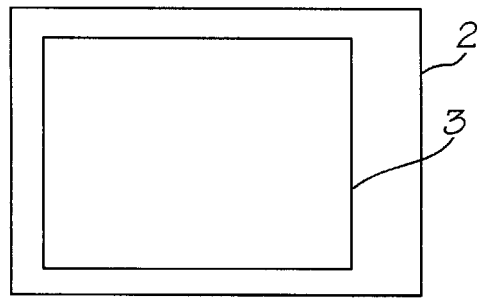 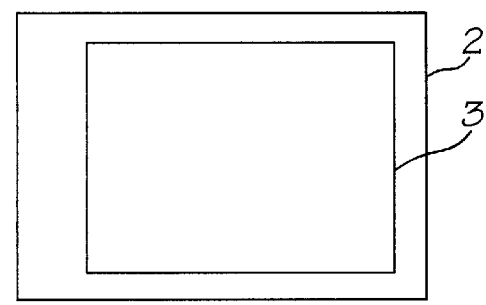
Fig. 2A    Fig. 2B

HORIZONTAL POSITION ADJUSTING CIRCUIT FOR RASTER

CLAIM OF PRIORITY

This application makes reference to, incorporates the same herein, and claims all benefits accruing under 35 U.S.C. § 119 from an application for HORIZONTAL POSITION ADJUSTING CIRCUIT FOR RASTER earlier filed in the Korean Industrial Property Office on the $31^{st}$ of Jul. 1997 and there duly assigned Serial No. 21232/1997.

TECHNICAL FIELD

The present invention relates in general to an image display instrument, such as a TV receiver or a monitor using a cathode-ray tube, and more particularly to a horizontal position adjusting process and circuit for a raster which is capable of adjusting a horizontal position of the raster occurring on a fluorescent screen of the cathode-ray tube.

RELATER ART

Generally, an image display instrument includes a cathode-ray tube having an electron gun provided at a neck of the cathode-ray tube, and a fluorescent screen is provided at the front surface thereof, on which screen an electron beam outputted from the electron gun collides.

A deflection coil is provided on the outer side of the neck of the cathode-ray tube, and a deflection magnetic field is generated by the deflection coil. According to the deflection magnetic field, the electron beam discharged from the electron gun is deflected so as to be horizontal and to form a scanning line.

A raster is formed on the fluorescent screen of the cathode-ray tube by the scanning line, and the raster displays a predetermined image screen. A center of the image screen is identical to the center of the fluorescent screen of the cathode-ray tube, so that the image screen is displayed at the center without being slanted. For this purpose, the image display instrument includes a horizontal position adjusting circuit by which the raster is formed at the center of the fluorescent screen. In such an image display instrument, a problem arises when the position of a raster is selected from a predetermined position, in that the position of the raster is not properly adjusted due to its failure to correspond to a video mode of the image signal outputted from a computer system. This causes the raster to be formed in a slanted manner, that is, displaced to one side or the other of the display screen.

Since the raster is formed in such a distorted manner, even if the position of the image screen displayed on the fluorescent screen is adjusted by a horizontal display position adjusting circuit, it frequently occurs that the position of the image screen does not coincide with the center position of the fluorescent screen. This causes discomfort and/or dissatisfaction to the user, as well as poor reliability of the image display instrument. Therefore, there is a need for the development of a horizontal position adjusting circuit for a raster, in which a horizontal position of the raster is adaptively adjusted in accordance with the operating mode of the image display instrument. That is, there is a need for the development of a horizontal position adjusting circuit which will ensure that the raster is positioned at the center of the fluorescent screen of a cathode-ray tube of the display instrument. Finally, there is a need for the development of a horizontal position adjusting circuit which automatically adjusts the raster so that it is positioned at the center of the screen of the cathode-ray tube.

SUMMARY OF THE INVENTION

An object of the present invention is to provide a horizontal position adjusting circuit for a raster, in which circuit a horizontal position of the raster is adaptively adjusted in accordance with an operating mode of an image display instrument so as to be positioned at the center of a fluorescent screen of a cathode-ray tube.

Another object of the present invention is to provide a horizontal position adjusting circuit for a raster by means of which a horizontal position of the raster is automatically adjusted so as to be positioned at the center of the fluorescent screen of the cathode-ray tube.

To achieve these and other objects, there is provided a horizontal position adjusting circuit for a raster, with a reference voltage outputting unit for outputting a reference voltage to enable a raster to be centered on a fluorescent screen; a reference voltage adjusting unit for varying the output voltage of the reference voltage outputting unit in accordance with an operating mode which displays an image signal; and a deflection voltage outputting unit for generating a deflection voltage in accordance with the output voltage of the reference voltage outputting unit and for applying it to a horizontal deflection coil.

Additional advantages, objects and other features of the invention will be set forth in part in the description which follows and in part will become apparent to those having ordinary skill in the art upon examination of the following or may be learned from practice of the invention. The object and advantages of the invention may be realized and attained as particularly pointed out in the appended claims.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 1 is a diagram of a horizontal position adjusting circuit;

FIGS. 2A and 2B Shows a position variation of the raster in accordance with the switching operation of a switch in the horizontal position adjusting circuit of FIG. 1.

DETAILED DESCRIPTION OF THE INVENTION

Figure 3:
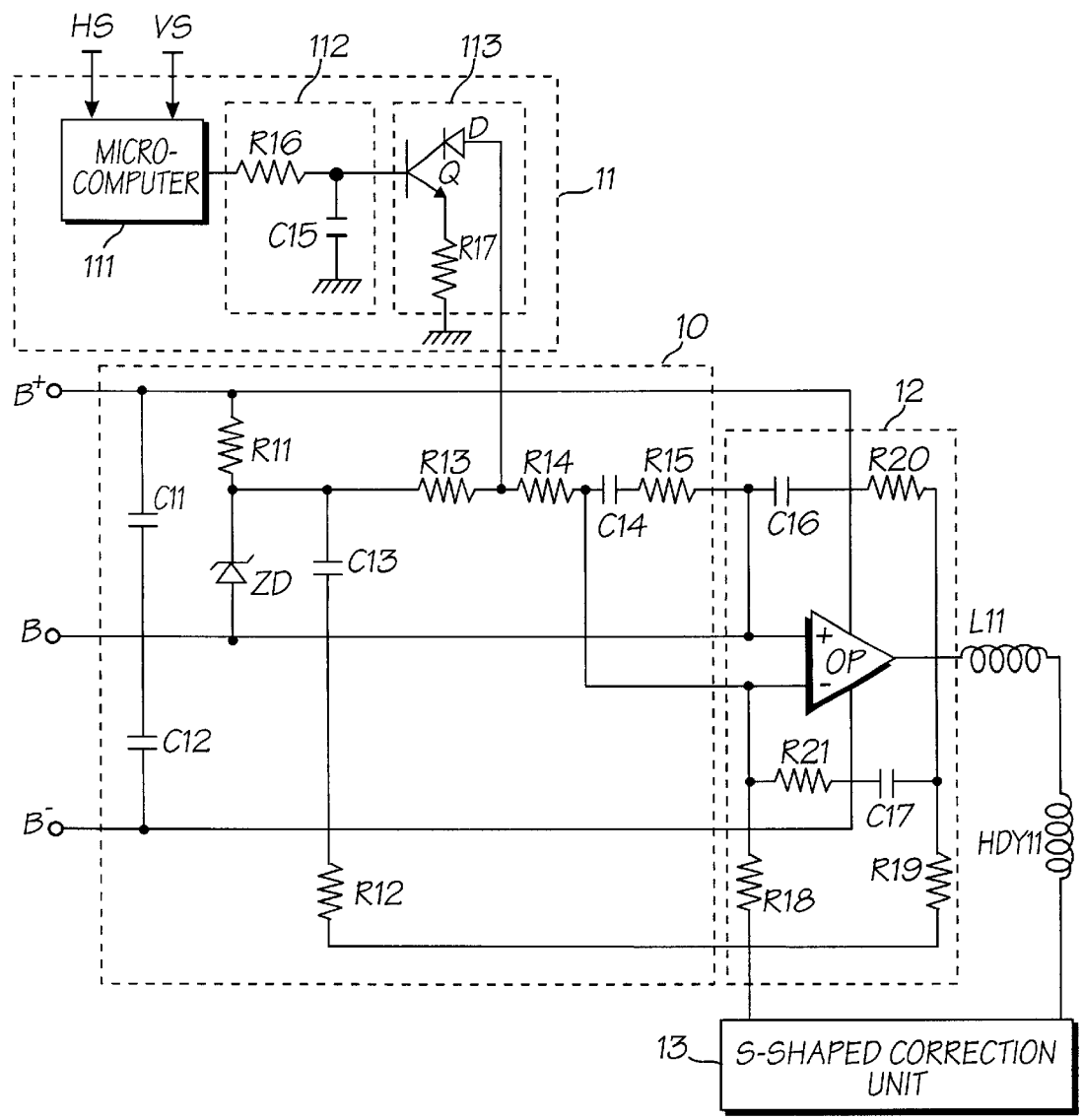
FIG. 3 is a diagram of a horizontal position adjusting circuit for a raster in accordance with the present invention.

A preferred embodiment of the present invention will now be described with reference to the accompanying drawings. FIG. 1 is a diagram of a horizontal position adjusting circuit where the raster is formed at the center of the fluorescent screen on a monitor.

Reference numeral 1 denotes an S-shaped correction unit for correcting an image which is possibly displayed as an S-shape on the fluorescent screen of the cathode-ray tube. A terminal at one side of the S-shaped correction unit 1 is connected to an operable terminal of a switch SW through a capacitor Cl, while a fixing terminal (a) at one side and a fixing terminal (b) at the other side of switch SW are connected to a cathode of a diode D1 and an anode of a diode D2, respectively. The anode of the diode D1 and the cathode of the diode D2 are connected to the S-shaped correction unit 1 through the capacitor C2, and are commonly connected through a serially connected, resistance R1, coil L1 and horizontal deflection coil HDY1, to a terminal at the other end of the S-shaped correction unit 1. In the horizontal position adjusting circuit just described, when the operating terminal of the switch SW is connected to the fixing terminal (a), deflection current flows through the deflection coil HDY1, coil L1, resistance R1, diode D1 switch SW and capacitor C1. Then, as shown in FIG. 2a, a raster 3 is displayed as being slanted to the left on the fluorescent screen 2 of the cathode-ray tube.

When the operating terminal of the switch SW is connected to the fixing terminal (b), conversely to the above case, the deflection current sequentially flows though the capacitor C1, switch SW, diode D2, resistance R1, coil L1 and deflection coil HDY1. Then, as shown in FIG. 2b, the raster 3 is displayed as being slanted to the right on the fluorescent screen 2 of the cathode-ray tube. The resistance R1 serves as a current limiter to limit the flow of overcurrent, and coil L1 is connected in series with the horizontal deflection coil HDY1 to thereby control the value of the overall inductance.

In accordance with the technique just described, the position of the raster 3 formed on the fluorescent screen 2 of the cathode-ray tube is selected based on the position of switch SW. Generally, in a computer system in which a predetermined image signal is outputted to an image display instrument for display, the frequency of a synchronous signal outputted simultaneously with the image signal is not identical, depending on the operating mode of a video card. Owing to the difference in frequency of the synchronous signal, the position of the image screen displayed on the cathode-ray tube of the image display instrument is varied. Therefore, according to the above technique, where the position of the raster 3 is selected from a pre-determined position, the raster's position is not properly adjusted due to failure to correspond to a video mode of an image signal outputted from the computer system, causing the raster to be formed slanted to one side or the other of the display screen. Likewise, since the raster is formed slantwise, even if the position of the image screen being displayed on the fluorescent screen is adjusted by horizontal display position adjusting circuitry, it frequently occurs that the position of the image screen does not coincide with the center position of the fluorescent screen and this causes discomfort or dissatisfaction to the users, as well as deterioration in reliability of the product.

FIG. 3 is a diagram of a horizontal position adjusting circuit for a raster in accordance with the present invention. Reference numeral 10 denotes a reference voltage outputting unit for outputting a reference voltage enabling the raster I to be positioned at the center of the fluorescent screen. Capacitors C11 and C12 are connected between the power terminals B+ and B−, respectively, and central power terminal B of the reference voltage outputting unit 10.

The power terminal B+ is connected to the central power terminal B though the resistance R11 and the parallel arrangement of reference diode ZD and capacitor C13. A terminal at one side of the S-shaped correction unit 13 is connected through resistance R12 the parallel arrangement of diode ZD and capacitor C13. Resistances R13 and R14, capacitor C14 and resistance 15 are connected in series to the contact point between the resistance RI 1, reference diode ZD and the capacitor C13.

Voltage adjusting unit 11 varies a reference voltage outputted by the reference voltage outputting unit 10 in accordance with an operating mode. In voltage adjusting unit 11, the integrator 112 is connected to an output terminal of a microcomputer 111, which determines an operating mode by using the frequency of a horizontal synchronous signal HS or a vertical synchronous signal VS, and outputs a corresponding PWM signal. Microcomputer 111 is connected to a grounded capacitor C15 through a resistance R16. An outputting unit 113 is constructed in that an output terminal of the integrator 112 is connected to a base of a transistor Q, a resistance R17 is connected to an emitter of the transistor Q, and a contact point of resistances R13 and R14 is connected to a collector of the transistor Q through a diode D.

Deflection voltage outputting unit 12 outputs a deflection voltage in accordance with a reference voltage provided by the reference voltage outputting unit 10.

The resistance R15 and the central power terminal B of reference voltage outputting unit are connected to a non-inverting input terminal (+)of an operating amplifier OP of deflection voltage outputting unit 12. A first terminal of the S-shaped correction unit 13 is connected via resistance R18 to an inverting input terminal (−) of operating amplifier OP. Moreover, the junction between resistance R14 and capacitor C14 is also connected to the inverting input terminal (−) of the operating amplifier OP.

The first terminal of the S-shaped correction unit 13 is also connected via resistance R19 to the output terminal of the operating amplifier OP. This output terminal is also feedback-connected to the non-inverting input terminal (+) of the operating amplifier OP through a resistance R20 and a capacitor C16, while being feedback-connected to the inverting input terminal (−) of the operating amplifier OP through a capacitor 17 and a resistance R21. The output terminal of the deflection voltage outputting unit 12 is connected to a second terminal of the S-shaped correction unit 13 through a coil L11 and a horizontal deflection coil HDY11. A positive voltage is applied to the power terminal B+ with the central power terminal B serving as a reference, while a negative voltage is applied to the power terminal B− with the central power terminal B again serving as a reference.

With the horizontal position adjusting circuit of the present invention being constructed as above, when power is applied to the power terminals B+ and B− and to the central power terminal, the applied power is stabilized by the capacitors C11 and C12 of the reference voltage outputting unit 10, and is supplied to the operating amplifier OP of the deflection voltage outputting unit 12 as operating power so that the operating amplifier OP can be normally operated.

The voltage applied to power terminal B+ is applied to the reference diode ZD through the resistance R11 so as to be converted to a constant voltage and stabilized by the capacitor C13 for output. The stabilized power provided by reference diode ZD and capacitor C13 is applied to the inverting input terminal (−) through the resistances R13 and R14, while the voltage applied to central power terminal B is applied to the non-inverting input terminal (+) of the operating amplifier OP.

The operating amplifier OP compares and amplifies the voltages applied to the inverting input terminal (−) and the non-inverting input terminal (+) so as to output a deflection voltage, and the outputted deflection voltage flows to the horizontal deflection coil HDY11 through the coil L11, thereby forming a raster at a predetermined position of the fluorescent screen of the cathode-ray tube. Under this condition, the microcomputer 11 of the reference voltage adjusting unit 11 makes a determination as to whether it is in an operating mode by using a frequency of the inputted horizontal synchronous signal HS and the inputted vertical synchronous signal VS, and then outputs a PWM signal in accordance with the operating mode as determined.

The PWM signal outputted by the microcomputer 111 is converted to a direct current level through the capacitor C15 and the resistance R16 of the integrator 112, and is then applied to the base of the transistor Q. Then, a collector current in accordance with a duty ratio of the PWM signal outputted by the microcomputer 111 flows to the collector of the transistor Q, and the voltage at the junction between the resistances R13 and R14 is varied according to the collector current of the transistor Q, so that the voltage applied to the inverting input terminal (−) of the operating amplifier OP is subsequently varied.

As the voltage applied to the inverting input terminal (−) of the operating amplifier OP is varied, the output voltage of the output terminal varies, and as the output voltage of the operating amplifier OP is varied, the deflection current flowing to the horizontal deflection coil HDY11 is also varied, so that the position of the raster formed on the fluorescent screen of the cathode-ray tube is adjusted.

For example, assuming that the voltage applied to the non-inverting input terminal (+) of the operating amplifier OP is higher than the voltage applied to the inverting input terminal (+), the operating amplifier OP outputs a positive voltage and, in accordance with the positive voltage output of the operating amplifier OP, a predetermined deflection current flows to the horizontal deflection coil HDY through the coil L11 from the output terminal of the operating amplifier OP.

On the other hand, assuming that the voltage applied to the non-inverting input terminal (+) of the operating amplifier OP is lower than the voltage applied to the inverting input terminal (−), the operating amplifier OP outputs a negative voltage and, in accordance with the negative voltage of the operating amplifier OP, a predetermined deflection current flows to the output terminal of the operating amplifier OP through the horizontal deflection coil HDY and the coil L11 from the other terminal of the S-shaped correction unit 13. Likewise, in accordance with the predetermined current flowing to the horizontal deflection coil HDY11, the position of the raster formed on the fluorescent screen of the cathode-ray tube is adjusted.

The PWM values corresponding to each operating mode are stored in a memory (not shown) within the microcomputer 111. When the operating mode is actuated, since the PWM signal corresponding to that operating mode is to be outputted, the memory capacity of the microcomputer 111 must be large. Accordingly, in the present invention, the horizontal synchronous signal and the vertical synchronous signal are classified by frequency band, and the PWM signal is stored according to the classified frequency band. When an image signal is to be displayed, the frequency of the horizontal synchronous signal and the vertical synchronous signal determines a corresponding frequency band so as to output a corresponding PWM signal.

As described, in the present invention, the position of the raster formed on the fluorescent screen of the cathode-ray tube is automatically adjusted according to the operating mode, so that positioning of the image screen on the fluorescent screen is simply adjusted so as to be at the center of the fluorescent screen, resulting in highly improved reliability for the image display instrument.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. A horizontal position adjusting circuit for a raster, comprising:

a reference voltage outputting unit for outputting a reference voltage to enable the raster to be centered on a fluorescent screen;

a reference voltage adjusting unit connected to said reference voltage outputting unit for varying the reference voltage outputted by the reference voltage outputting unit in accordance with an operating mode so as to display an image signal; and a deflection voltage outputting unit connected to said reference voltage outputting unit for generating a deflection voltage in accordance with the reference voltage outputted by the reference voltage outputting unit and for applying the deflection voltage to a horizontal deflection coil;

wherein said reference voltage outputting unit is connected to a positive power terminal, a negative power terminal and a central power terminal, and wherein said reference voltage outputting unit comprises a resistor and a diode connected between said positive power terminal and said central power terminal, and a capacitor connected between said negative power terminal and said central power terminal.

2. The circuit as claimed in claim 1, wherein said positive power terminal and said negative power terminal are connected to an operating amplifier for providing supply voltages thereto, and wherein said central power terminal is connected to a non-inverting input of said operating amplifier.

3. The circuit as claimed in claim 1, wherein a junction between said resistor and said diode is connected by means of at least one circuit element to at least one of a non-inverting input of said operating amplifier and an output of said operating amplifier.

4. The circuit as claimed in claim 3, wherein said at least one circuit element comprises at least one resistor and at least one capacitor.

5. The circuit as claimed in claim 3 wherein said junction between said resistor and said diode is connected by at least one resistor to the inverting input of said operating amplifier.

* * * * *